US00RE45851E

(19) United States
(12) Reissued Patent
Bodine

(10) Patent Number: US RE45,851 E
(45) Date of Reissued Patent: Jan. 19, 2016

(54) CEILING PANEL

(71) Applicant: AWI Licensing Company, Wilmington, DE (US)

(72) Inventor: Darryl C. Bodine, St. Joseph, MI (US)

(73) Assignee: AWI Licensing Company, Wilmington, DE (US)

(21) Appl. No.: 14/154,169

(22) Filed: Jan. 13, 2014

Related U.S. Patent Documents

Reissue of:
(64) Patent No.: 6,108,994
Issued: Aug. 29, 2000
Appl. No.: 09/141,407
Filed: Aug. 12, 1998

(51) Int. Cl.
*E04B 5/00* (2006.01)
*E04B 9/06* (2006.01)

(52) U.S. Cl.
CPC .. *E04B 9/067* (2013.01); *E04B 9/06* (2013.01)

(58) Field of Classification Search
CPC ..... E04B 9/06; E04B 9/067; E04B 9/242
USPC ..... 52/506.07, 506.08, 506.09, 510
See application file for complete search history.

(56) References Cited

U.S. PATENT DOCUMENTS

| | | | |
|---|---|---|---|
| 2,318,092 | A | 5/1943 | Olsen |
| 2,481,794 | A | 9/1949 | Stitt |
| 3,001,616 | A | 9/1961 | Griffin |
| 3,248,839 | A | 5/1966 | Roberts et al. |
| 3,332,194 | A | 7/1967 | Jack |
| 3,488,908 | A | 1/1970 | Jahn |
| 3,492,935 | A | 2/1970 | Thomas |
| 3,640,042 | A | 2/1972 | Kidney |
| 3,693,303 | A | 9/1972 | Downing, Jr. et al. |
| 3,714,753 | A | 2/1973 | Jahn |
| 3,900,997 | A | 8/1975 | Ollinger et al. |
| 4,189,893 | A | 2/1980 | Kuhr |
| 4,206,578 | A | 6/1980 | Mieyal |
| 4,283,891 | A | 8/1981 | Moeller |
| 4,317,418 | A | 3/1982 | Courshon, Jr. et al. |
| 4,520,609 | A | 6/1985 | Worley et al. |
| 4,696,141 | A | 9/1987 | Nassof |

(Continued)

FOREIGN PATENT DOCUMENTS

| | | | |
|---|---|---|---|
| AU | 206159 | 11/1959 | ..... 52/506.07 |
| BE | 701674 A | 7/1967 | |

(Continued)

OTHER PUBLICATIONS

Notice and Grounds of Opposition of European Patent.Jul. 13, 2005.

(Continued)

*Primary Examiner* — Mark Wendell
(74) *Attorney, Agent, or Firm* — Amy M. Fernandez

(57) ABSTRACT

A ceiling panel that conceals the grid in a suspended ceiling, having opposed active first and second edges with profiles different from one another, and opposed passive edges. An access kerf, and a registration kerf, at different levels in the active edges, along with a registration step in one active edge, permit the panel to be inserted, or removed, by successive hinge actions. When installed, the panel is locked to the ceiling with no visual indications on how the panel can be removed. During installation the panel is self-centering and self-aligning.

41 Claims, 6 Drawing Sheets

(56) References Cited

U.S. PATENT DOCUMENTS

| | | | | |
|---|---|---|---|---|
| 4,722,161 | A | 2/1988 | Young | |
| 4,760,677 | A | 8/1988 | Nassof | |
| 4,852,325 | A | 8/1989 | Dunn et al. | |
| 4,862,663 | A | 9/1989 | Krieger | |
| 4,869,031 | A | 9/1989 | Mallory | |
| 5,417,025 | A | 5/1995 | Nute et al. | |
| 5,507,125 | A | 4/1996 | McClure | 52/506.07 |
| 5,623,800 | A | 4/1997 | Shinkosky | 52/506.08 X |

FOREIGN PATENT DOCUMENTS

| | | | | |
|---|---|---|---|---|
| FR | 1227191 | | 8/1960 | |
| FR | 1313963 | | 12/1963 | |
| GB | 738967 | A | 10/1955 | |
| GB | 810740 | A | 3/1959 | |
| GB | 833307 | A | 4/1960 | |
| GB | 2163787 | | 3/1986 | 52/506.07 |
| GB | 2163787 | A | 3/1986 | |
| GB | 2204073 | | 11/1988 | 52/506.07 |
| GB | 2 220 151 | | 12/1990 | |
| GB | 2273511 | A | 6/1994 | |

OTHER PUBLICATIONS

Reply from Patent Proprietor to the Notice of Opposition.Mar. 1, 2006.
Summons to Attend Oral Proceedings.Jul. 3, 2006.
Letter from Patent Proprietor re Opposition Proceedings.Oct. 18, 2006.
Letter from Opponent re Opposition Proceedings.Oct. 26, 2006.
Decision of Opposition Division.Dec. 18, 2006.
Minutes from the Oral Proceedings of Nov. 20, 2006.
Notice of Appeal.Feb. 16, 2007.
Grounds of Appeal.May 7, 2007.
Patent Proprietor Response to Grounds of Appeal.Nov. 15, 2007.
Opponent Letter re Oral Proceedings Formalities.Dec. 23, 2008.
Notification of Decision on Appeal.Mar. 26, 2009.
Grounds for the Decision of the Opposition Division.Dec. 28, 2006.
Reply by Opponent to Patent Proprietor Response to Grounds of Appeal.Jul. 3, 2008.

FIG. 2
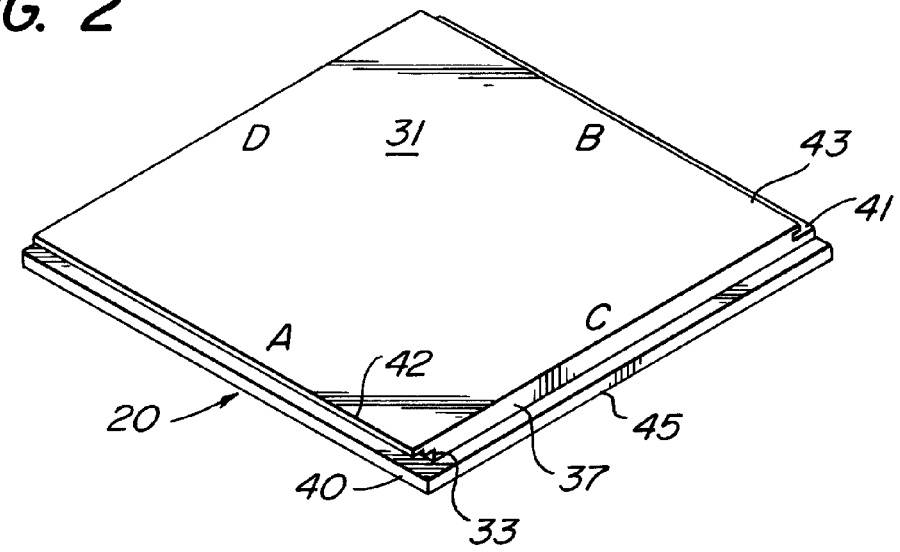
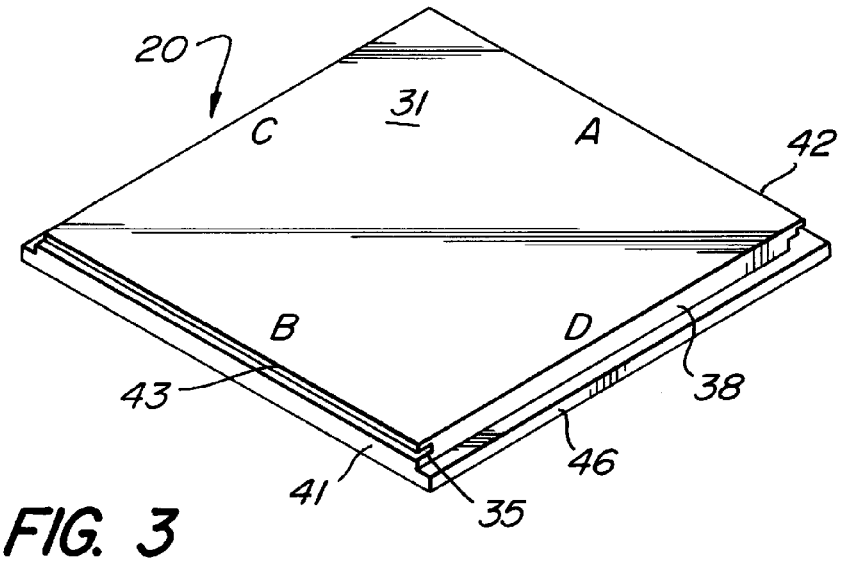
FIG. 3

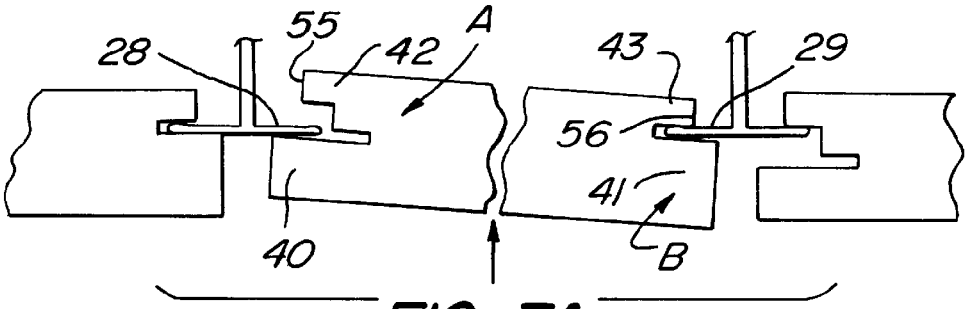
FIG. 7A
FIG. 7B
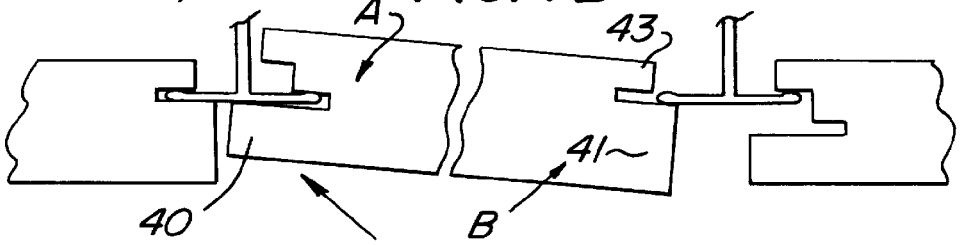
FIG. 7C
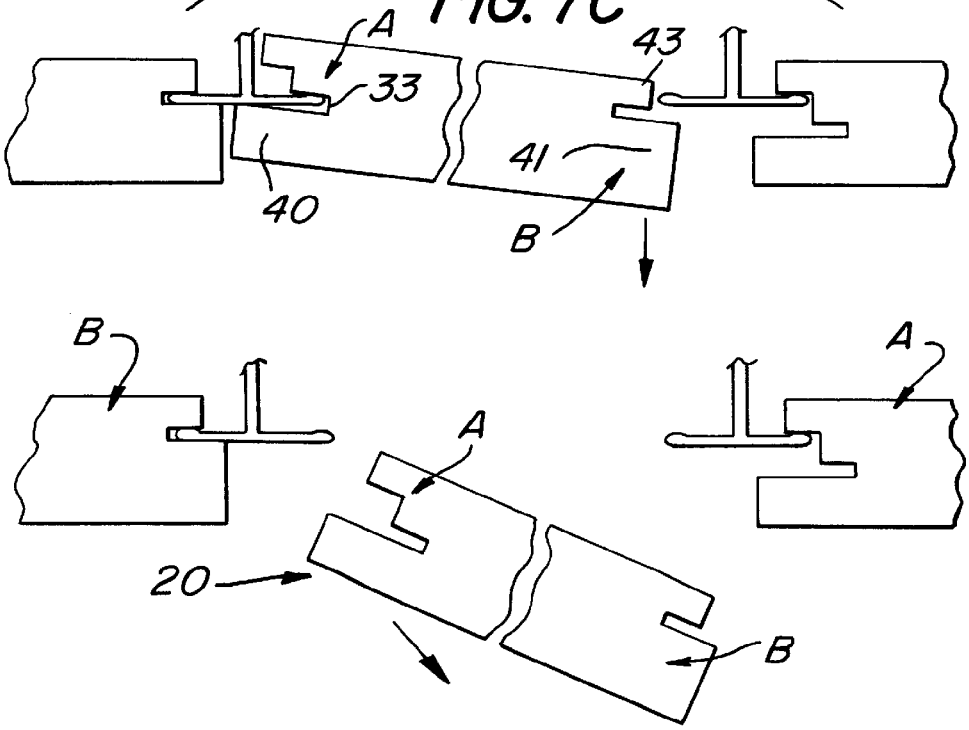
FIG. 7D

CEILING PANEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of U.S. Pat. No. 6,108,994, filed Aug. 12, 1998, and issued Aug. 29, 2000; the contents of which are hereby incorporated herein in their entirety.*

BACKGROUND OF THE INVENTION

1. Field of the Invention

This invention relates to a panel for use with a supporting grid in a suspended ceiling. The panel is of the type that conceals part or all of the grid, when viewed from below.

2. Background Information

Suspended ceilings are common. They use a grid of metal beams in the form of an inverted T-section, commonly of a 15/16" flange width dimension, to support the panels. The rectangular openings formed by the grid are generally either 24"×24" or 24"×48" with correspondingly sized panels. However, irregularly shaped and sized openings and panels are used. Dimensions may be in metric units.

The present invention applies to such suspended ceilings and panels.

The panels are of various ceiling substrates, such as mineral fiber, fiberglass, wood, metal, plastic, or other composition. They are positioned within the grid opening, and are supported by the grid. The panels are either of the type that expose the grid when the ceilings are viewed from below, or conceal the grid either fully or partially, when viewed from below. This invention involves those panels that conceal the grid when viewed from below.

Panels for a ceiling with exposed grids have a form of upper lip extending over the top of the grid with no lip on the panel below the grid. The panel hangs from the grid, by means of this upper lip. Such panel is relatively simple to install, position and remove. These panels are not intended to be locked by themselves to the grid.

Panels that conceal the grid from below, on the other hand, pose special problems, since the portion of the edge underlying the grid interferes with any simple installation, positioning, and removal. Panels that conceal the grid, however, are desirable for among other benefits, their appearance, as well as their ability to lock to the grid. The grid can be partially or totally hidden. Additionally, since the panels of this type cover the metal grid, they can have a beneficial effect during a fire, since they serve to insulate the metal from the effects of the heat, particularly, where panels are of a fire retardant material, as is generally the case.

Since panels that conceal generally have a lip below the grid as well as one above the grid, there is the potential for locking the panel to the grid. This is especially useful again during a fire, and even more so during a seismic disturbance. Falling panels during a quake present a serious threat to the safety of persons present below the ceiling, and particularly so where gatherings occur such as in auditoriums or public areas.

Panels locked to the grid which give no visual clue to their removal procedure also provide a degree of security against unauthorized access to the space above the ceiling.

Notwithstanding the desirable features of panels that conceal the grid, their use has been limited to a great degree because of problem with installation and removal. In some instances, special shaped grids must be used. In other designs, auxiliary clips or metal attachments to the grid are necessary. Generally, the space above the grid must be used in installing, or removing the panel, requiring such space to be available, thus reducing room height.

In some instances, the installer must position each panel visually from below, with a resulting slowdown in installation. Even without the necessity of visual positioning during installations, in prior art panels that conceal, the installation is a relatively slow procedure.

Often, in prior art, special tools were necessary to install or remove panels that lock or conceal.

Prior art patents relating to panels in suspended ceilings that conceal the grid, and in some instances lock, include U.S. Pat. Nos. 2,218,092, 3,640,012, 3,714,752, 3,900,997, 4,189,895, 4,696,141, 4,760,677, 4,862,663, and U.K. Patent 2,200,151B, and French patents 1,313,963, and 1,227,191. These panels show various edge designs that engage the grid.

SUMMARY OF THE INVENTION

The panel of the present invention is easy to install in a ceiling. Two opposed active, parallel edges, designated first and second edges A and B, different from one another in profile, without interference from at least two opposed passive third and fourth edges C and D that can be the same as one another, enable the panel to be pivoted about designated active first edge A in engagement with a flange, into a generally horizontal position. The panel is then shifted to engage the opposing active edge, designated second edge B, with its adjacent grid flange. During the shift, the panel slightly rotates, seats, and locks into position. In effect, the opposed active first and second edges A and B, each with its distinctive profile different from the other, serve successively as hinges, with the adjacent grid flange, to install the panel.

Since the panel is installed in the ceiling from below with no need for access to space above the grid, higher ceiling heights are possible, and there is no interference with plenum utilities during panel installation or service.

When installed, the panel a) conceals the supporting grid;
b) looks the same as the other panels in the ceiling;
c) is supported by the grid;
d) is locked in place vertically and horizontally;
e) provides no visual clue as to how the panel can be removed;
f) resists removal from random efforts by individuals unknowledgeable in the unlocking procedure;
g) strongly tends to remain in place during destructive events such as fire or seismic disturbances.

The panel is also easy to remove from the ceiling, providing the removal procedure is known. Once it is known how to locate a specific edge, the installation steps are simply reversed, to remove the panel.

No tools are necessary to install or remove the panel.

The present invention can be used not only with rectangular panels, but also with hexagonal, octagonal, and other regular and irregular shapes. It is only necessary that the panel have two active, opposing, parallel first and second edges A and B having distinctive profiles, different from one another, each with the profile disclosed herein. The remaining edges of the panel are passive.

BRIEF DESCRIPTION OF THE DRAWINGS

FIG. 2 is a perspective view of the panel of the invention showing first and third edges A and C.

FIG. 3 is a perspective view of the panel showing second and fourth edges B and D.

FIGS. 7A through 7D are schematic horizontal sectional views with the panel first and second edges A and B in profile, showing the progressive steps in removing a panel from the ceiling.

DESCRIPTION OF THE PREFERRED EMBODIMENT

Figure 1:
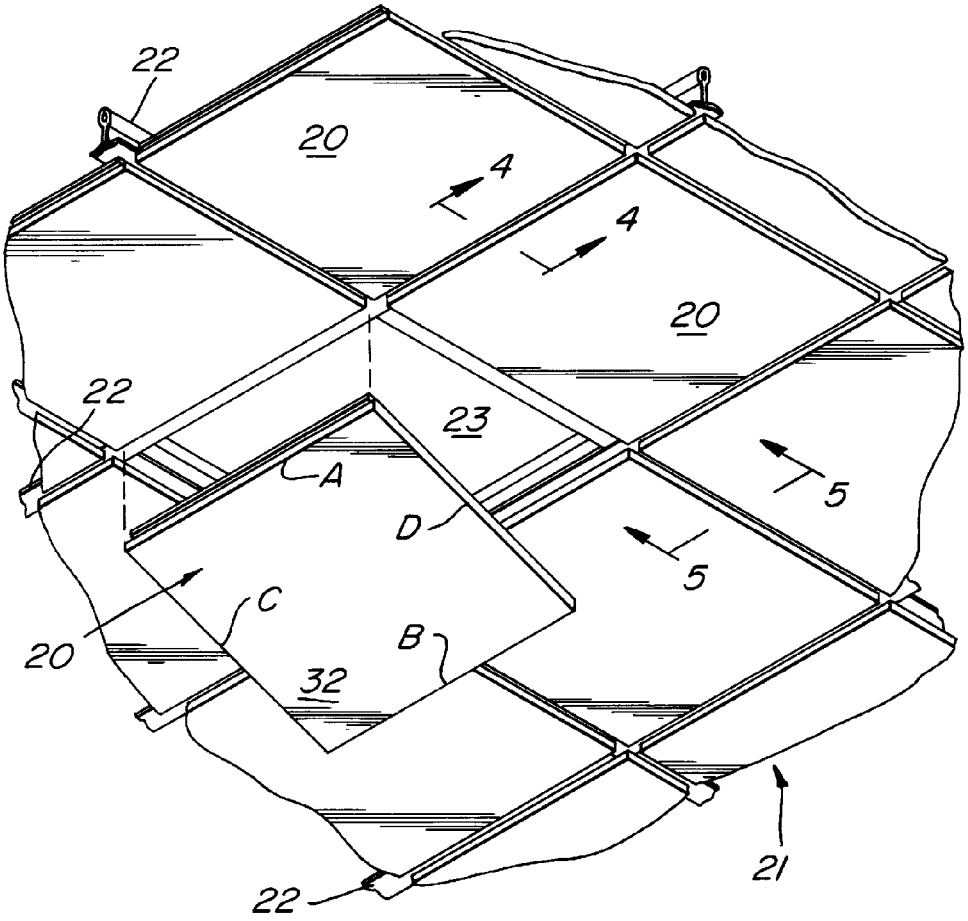
FIG. 1 is a perspective view, from below, of a ceiling that uses the panel of the invention, one of which is shown in position as it is being installed.

The panel 20 of the invention is of the type, which is installed in a grid ceiling 21, supported by metal grids 22 having inverted T cross-sections. Such grids 22 are generally used to form a square opening 23, of a 24"×24" dimension as shown in FIG. 1, or a rectangular opening, 24"×48". The present invention is applicable to either such size opening, or any other size rectangular opening, as well as hexagonal, octagonal, or other regular or irregular shapes, as will later be explained.

Additionally, a panel may carry a decor or fanciful design on its lower face, or a sculptured surface that provides a three dimensional effect to the ceiling.

In the embodiment described below, the invention is shown on a square panel, of for instance, a 24"×24" dimension.

The panel 20 can be of any various substrates, such as mineral fiber, fiberglass, wood, metal, plastic, or other composition. The substrate however, must be capable of having formed on a panel the edge profiles disclosed herein. The thickness of the panel can be determined by forming the edges and then inserting and removing the panel to determine whether the edges resist damage, and are capable of supporting the panel in the ceiling, without being damaged. A thicker panel, however, results in the use of more material, so that an economic judgment must be exerted with respect to suitability of material used in this invention.

Grid 22, as seen in cross-section in the figures has, in the well-known fashion, a bulb 25, a web 26, and a flange having sides 28 and 29. The total flange width is generally 15/16". The invention works with all size flanges. As can be seen from the detailed disclosure that follows, the profile must be correspondingly sized to accommodate the different sized flanges.

The panel 20, in position in ceiling 21, has a flat top plane 31, and a flat bottom plane 32. The description of the panel in the following disclosure refers to the panel elements when the panel extend in a horizontal plane, as in a ceiling.

The invention involves opposed active first and second edges A and B, and opposed passive third and fourth edges C and D, on panel 20. A and B, active edges, are different from one another in profile. The edges are active in installing and removing a panel into and from the grid as later described in the text and drawings. Third and fourth edges C and D, passive edges, are alike. These edges are passive in installing and removing the panel from the grid as later shown and described in the drawings and text. Both first and second edges A and B have a horizontally extending kerf, designated access kerf 33 on edge A and registration kerf 35 on edge B, intended to receive a supporting grid flange side 28 or 29. Registration kerf 35 on edge B has an upperside or tread 30 that extends in a horizontal plane.

Figure 6A:
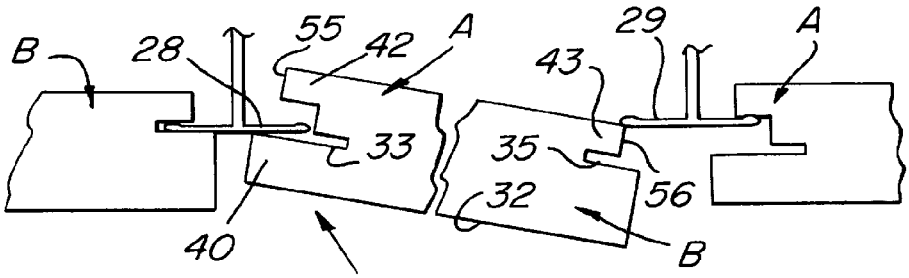
FIGS. 6A through 6D are schematic horizontal sectional views, with the panel first and second edges A and B in profile, showing the progressive steps in installing a panel in the ceiling.
Figure 6B:
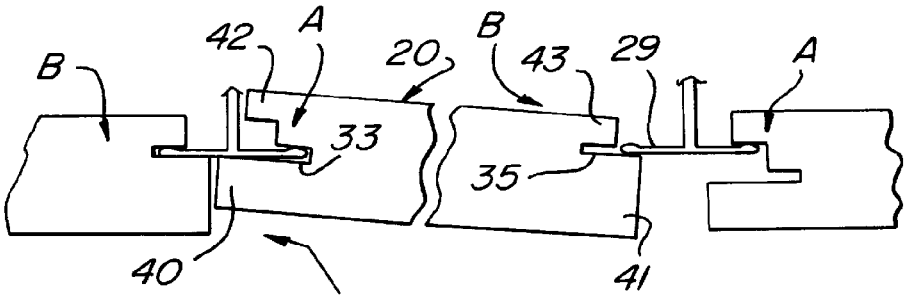

The access kerf 33 in first edge A is thick and deep enough to slidably receive flange side 28 or 29 of the grid flange, and deep enough to permit opposite second edge B to be rotated up into a position when registration kerf 35 in edge B aligns with its corresponding grid flange, as seen in FIG. 6B.

Figure 4:
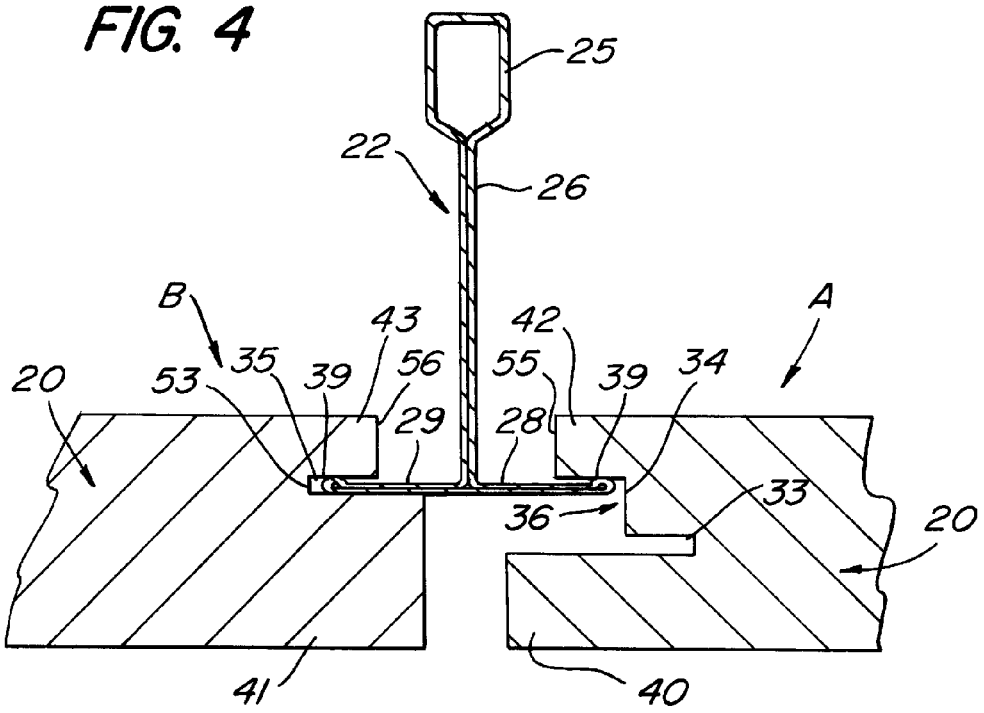
FIG. 4 is a horizontal sectional view of the ceiling taken on the line 4-4 in FIG. 1, showing first and second edges A and B of the panel in profile.
Figure 5:
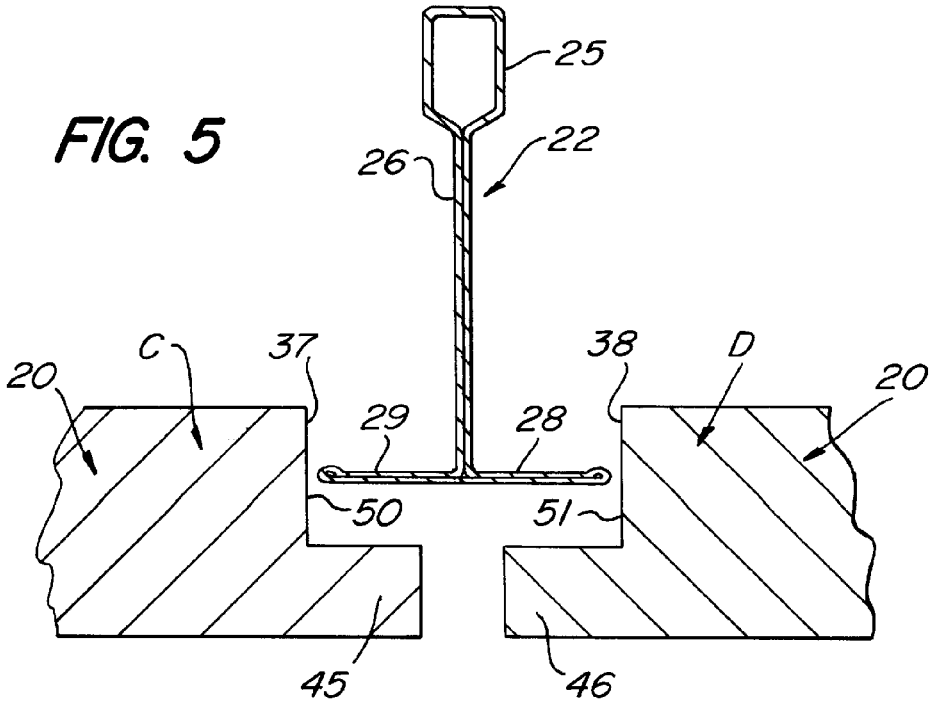
FIG. 5 is a horizontal sectional view similar to FIG. 4 taken on the line 5-5 in FIG. 1, showing third and fourth edges C and D in profile.

As seen, for instance, in FIG. 4, edge A has a registration step 36 having a vertical riser 34 and a horizontal tread 39. Tread 39 forms the lower horizontal surface of upper lip 42 on edge A. Tread 39 is at the same level as upper side or tread 30 of registration kerf 35 in edge B, which forms the lower surface of upper lip 43 on edge B. Tread 39 in first edge A and upper side or tread 30 of registration kerf 35 on second edge B form the supporting surfaces for panel 20 when the panel is in seated position on flange sides 28 and 29, as seen in FIG. 6D. Riser 34 in registration step 36 in edge A, and the inwardmost depth of registration kerf 35 at 53 in edge B position the panel 20 between flanges 28 and 29 as seen in FIGS. 4 and 6B. Wall 37 on edge C and wall 38 on edge D, likewise position panel 20 between flange sides 28 and 29 in a direction between those edges.

Upper lip 42 on edge A is cut back at 55, and upper lip 43 is cut back at 56 to avoid interference with the installation and removal of panel 20 into ceiling 21. Such installation and removal will be explained.

Lower lip 41 on edge B is thicker than lower lip 40 on edge A.

Lower lip 45 on edge C and lower lip 46 on fourth edge D also contribute to locking the installed panel 20 to the grid 22, as well as concealing the grid. The panel 20 is positioned horizontally within ceiling opening 23 by registration kerf 35, riser 34 of registration step 36, and wall 37 on third edge C and wall 38 on fourth edge D. Third and fourth edges C and D also have cutouts 50 on third edge C and 51 on fourth edge D, which permit installation and removal of the panel 20 without interference from these edges.

Access kerf 33 and registration kerf 35 are at different levels in the thickness of the panel 20. As viewed in profile, registration kerf 35 is at a higher level in the panel than access kerf 33. This permits a hinge action in the installation and removal of the panel as will be evident from the later explanation.

The edges A, B, C, and D on the rectangular panel 20 of the invention provide means for installing, positioning, locking, unlocking, and removing the panel in and from a suspended ceiling supported by a grid. The same means used for installing and locking are used to unlock and remove the panel from the ceiling. The panel edges A, B, C, and D also have means to conceal the flanges of the supporting grid when the panel is in place in the ceiling.

a) The First Step in Installing

The means for installing include the kerfs 33 in first edge A and 35 in second edge B of the panel. The registration kerf 35 in edge B is at a higher level in the panel than access kerf 33 in first edge A. Both kerfs extend in horizontal planes.

The panel 20 is first brought into position toward the ceiling in an inclined position, as shown in FIGS. 1 and 6A, with first edge A uppermost. As seen in FIG. 6B, the panel 20 is installed by first engaging the access kerf 33 in first edge A to form with the grid flange side 28, a hinge to pivot the panel 20 to a generally horizontal position in the ceiling 21, against the grid 22, wherein lower lip 41 on second edge B abuts flange side 29. At this point, the registration kerf 35 in second edge B will align with the adjacent flange side 29.

b) Second Step in Installing and Positioning

Figure 6C:
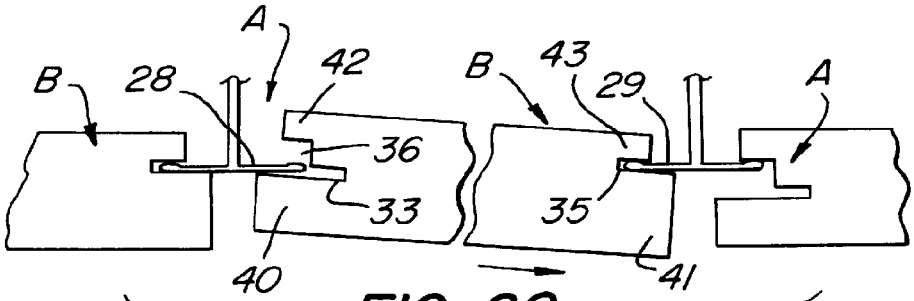
Figure 6D:
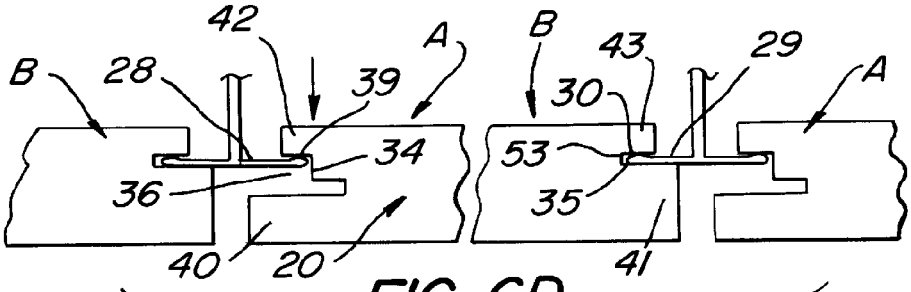

The entire panel is then shifted, or translated, toward the right as seen in FIG. 6C toward second edge B to seat the registration kerf 35 in second edge B on its adjacent flange side 29 on the grid 22. As this shift occurs, the access kerf 33 in first edge A slides away from and out of its adjacent flange, permitting first edge A to drop until it reaches the tread 39 of registration step 36, as seen in FIG. 6D. The panel 20 now lies in the horizontal plane of the ceiling, since the level of the tread 39 of the registration step 36 in first edge A is the same as that of the upper side or tread 30 of registration kerf 35 in second edge B, as seen in FIG. 6D.

The panel 20 can be slightly shifted back to the left against the vertical riser 34 of registration step 36, in what in effect is a feedback effect. This enables the installer to readily and virtually automatically minutely position the panel horizontally with a minimum of visual judgment, using simply a technique of feel.

c) Locking

The registration kerf 35 in second edge B, the registration step 36 including riser 34 and tread 39 in first edge A, vertical walls 37 and 38 on third and fourth edges C and D, and lips 40 to 43, 45 and 46 on edges A, B, C, and D, all act to lock the panel 20 to the grid 22.

d) Removal

When viewed from below, the grid 22 partially concealed in the embodiment described or totally concealed in an embodiment described later. The panels 20 give no clue as to how they are installed, or how they can be removed.

For removal, the steps necessary to install the panel 20 are reversed. The remover cannot determine by sight the edge on which to begin the removal procedure, since the panel 20 gives no clue. Indiscriminate efforts to lift or shift the panel are resisted by the panel, which is locked in position. It is necessary to know the removal procedure, which involves an exploratory gentle lift upward on the panel, preferably at the center, to determine which edge moves the most. The edge that moves the most is first edge A. Thus one knowledgeable in the removal process can begin the removal procedure knowing the directions required to maneuver the panel.

The panels 20 are removed in steps opposite to that in installation. To know where to begin, however, one must know which is first edge A. Random exploration without knowing what one is looking for does not cause the panels to unlock.

When a slight upward force is exerted on the center of the panel, first edge A will move slightly upward about the registration kerf 35 in second edge B as a hinge as seen in FIG. 7A. There is no interference from third and fourth edges C and D to this movement. One can then proceed with removal, based on the reversal of the installation steps. The panel 20 is shifted to the left, as seen in FIG. 7B. This permits second edge B to drop out of the grid as seen in FIG. 7C. Panel 20 can then fall free, as seen in FIG. 7D.

Figure 8:
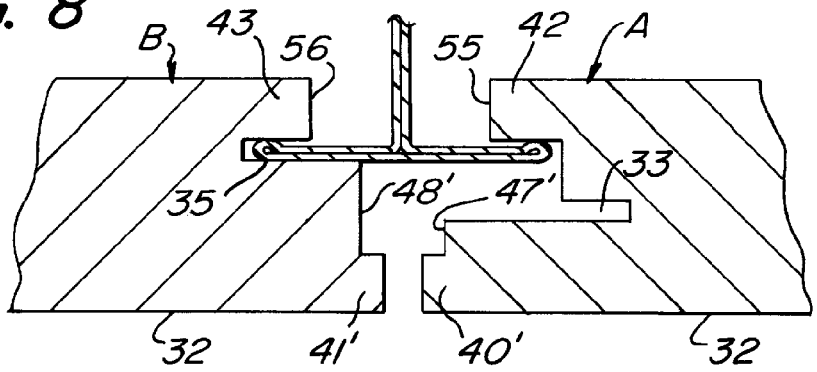
FIG. 8 is a partial sectional view of panels that conceal the grid to a greater degree than the panels shown in FIGS. 6A through 6D.
Figure 9:
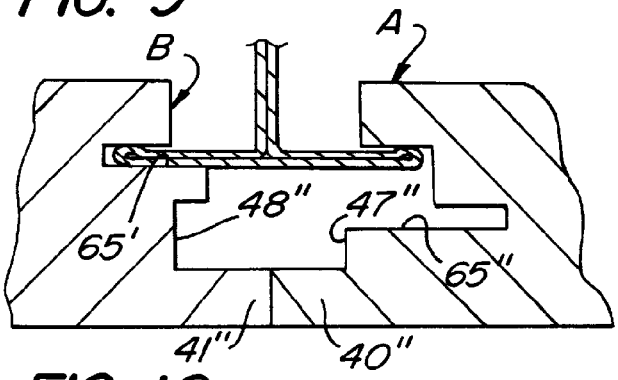
FIG. 9 is a partial sectional view of an embodiment of the invention where first and second edges A and B of the panels totally conceal the grid.
Figure 9A:
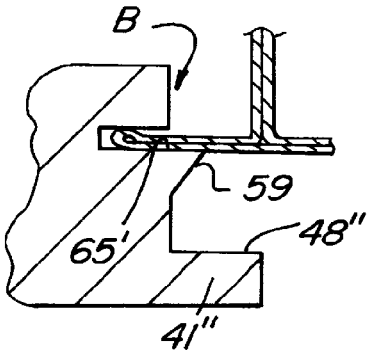
FIG. 9A is a view similar to FIG. 9 showing an alternative embodiment of edge B, where first and second edges A and B conceal the grid.

In FIG. 8, there is shown an alternative embodiment that conceals more of the grid than that of the embodiment described earlier. Lower lip 40' on first edge A has a cutout 47', and lower lip 41' on second edge B has a cut-out 48', which permit the insertion and removal procedure described above to take place without interference. In FIG. 9, cutouts 47" and 48" in lower lips 40" and 41" again permit installation and removal of the panel, where the panels totally conceal the grid. In FIG. 9A, cutout 48" is beveled at 59 to yield more space than the square cutout of FIG. 9.

It is important to note that there remains above cutouts 47" and 48" extended surfaces 65' and 65". These surfaces serve to guide access kerf 33 and registration kerf 35 into alignment with the adjacent grid flange and contribute to the feedback positioning aspect of the invention.

Lower lips 40' and 41' in the embodiment of FIG. 8, and lips 40" and 41" in the embodiment of FIG. 9 are suitably extended to provide the degree of grid concealment desired. Lower lips 45 and 46 on passive third and fourth edges C and D are also modified to provide the degree of grid concealment desired.

Any or all of the lower lips in any of the embodiments of the invention may be of irregular shape, such as scalloped, when viewed from below, to provide a further decorative effect to the ceiling.

Figure 10:
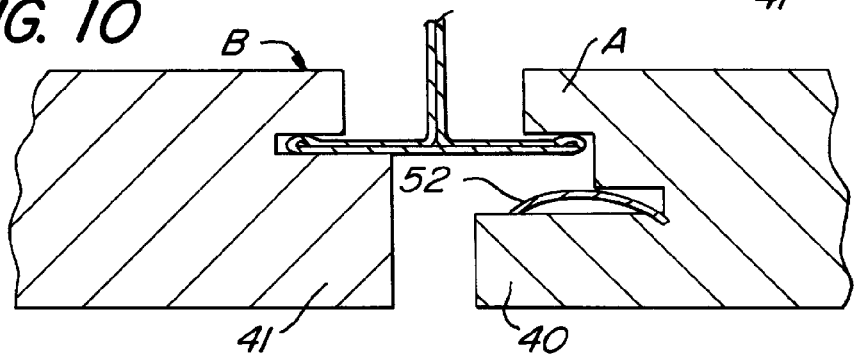
FIGS. 10 and 11 show a panel in partial sectional view having a locking spring.
Figure 11:
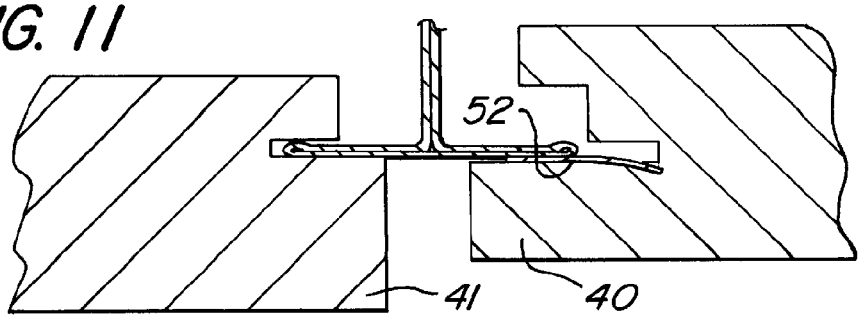

FIGS. 10 and 11 show an embodiment that uses a security spring 52 to increase the upward pressure necessary to lift first edge A during the removal procedure. The convex compression spring 52 of inverted U shape extends lengthwise in the first edge A.

Unless increased upward pressure is exerted on first edge A, the spring interferes with the entry of the flange into access kerf 33 on first edge A, as shown in FIG. 7B of the removal process. FIG. 10 shows the spring 52 in relaxes form with the panel installed in the ceiling. FIG. 11 shows the spring 52 in compressed form in the position shown corresponding to FIG. 7A of the removal procedure.

The invention can be used on panels with shapes other than rectangular. Such shapes must have opposed active first and second edges A and B with the profiles disclosed above. The remaining edges must all be passive, with no upper lips. Such shapes will have at least two opposed passive third and fourth edges C and D, each of which is positioned between the active first and second edges A and B.

I claim:

1. For use in a suspended ceiling that has a panel supporting grid formed of inverted T-section beams, a panel, when extending horizontally, having:

a) opposing first and second edges [(A and B,)] that are active in installing and removing the panel into and from the grid, each of which has a profile different from the other;

b) opposing third and fourth edges [(C and D)], each of which has a profile;

c) an access kerf [(33)] in the profile of the first edge [(A)] that extends along the first edge [(A)] at a first level;

d) a registration kerf [(35)] in the profile of the second edge [(B)] that extends along the second edge [(B)];

e) a tread [(30)] in the registration kerf [(35)] of the second edge [(B)] that extends along the second edge [(B)] above the *first* level of the access kerf [(33)] in the profile of the first edge [(A)];

f) a registration step having a riser [(34)] and a tread [(39)] in the profile of the first edge [(A)] that extends along the first edge [(A)] above the *first* level of the access kerf [(33)] in the first edge [(A)], the tread [(39)] being approximately at the same level as the tread [(30)] in the second edge [(B)]; and g) an upper lip [(42)] on the first edge [(A)] having an underside formed by the tread [(39)] of the registration step, and an upper lip [(43)] on the second edge [(B)] having an underside formed by the tread [(30)] of *the second* edge [B], each of said undersides of *said* upper lips [(42, 43)] being at approximately the same level when the panel extends in the plane of the grid, that support the panel in the ceiling;

*h) wherein none of the first, second, third or fourth edges can be identified as the first edge, the second edge, the third edge, or the fourth edge by visual inspection of the ceiling from below; and*

*i) wherein the first and second edges can be determined when the panel is installed in the ceiling by an upward force on the center of the panel, whereby the panel will pivot upward about the registration kerf in the second edge.*

2. The panel of claim 1 having a rectangular shape.

3. The panel of claim 1, wherein said panel can be inserted into and removed from [a] *the* grid [ceiling] without tools.

4. The panel of claim 1 wherein said panel further having a lower lip on [an edge of the panel] *each of the third and fourth edges* that is passive in installing and removing the panel from the grid.

5. The panel of claim 1 in combination with the grid recited in the preamble of claim 1, further having lower lips on at least the first edge [(A)] and the second edge [(B)] of the panel intended to conceal *the* grid when the panel is installed in [a ceiling] *the grid*.

6. The panel of claim 1 in combination with the grid recited in the preamble of claim 1, wherein the access kerf [(33)] in the first edge [(A)] and the registration kerf [(35)] in the second edge [(B)] successively form hinge means about a grid flange during installation and removal of the panel into and from [a ceiling] *the grid*.

7. The panel of claim 1 in combination with the grid recited in the preamble of claim 1, wherein the *upper* lips, *the access and registration* kerfs, *the* treads, and *the* riser of the registration step form means to lock the panel in the [ceiling] grid.

8. The panel of claim 7 in combination with the grid recited in the preamble of claim 1, wherein said panel further having *a* lower [lips] *lip* on *each of the* first [edge (A)] and second [edge (B)] *edges* intended to conceal *the* grid when installed in [a ceiling] *the grid*.

9. The panel of claim 7 wherein the registration kerf [(35)] in the second edge [(B)] and the access kerf [(33)] in the first edge [(A)] successively form hinge means to remove the panel from the ceiling.

10. The panel of claim 7, wherein the tread [(39)] and *the* riser [(34)] in the registration step [(36)] and surfaces adjacent *the access and registration* kerfs [(33 and 35)] in *the* first and second edges [(A and B)] provide means for a feedback in positioning the panel during installation.

[11. The panel of claim 1 or 2 wherein none of the edges can be identified as first edge (A), second edge (B), or third or fourth edges (C or D) by visual inspection of the ceiling from below.]

[12. A panel of claim 11 wherein the first and second edges (A and B) can be determined in a panel installed in a ceiling by an upward force on the center of the panel, whereby the panel will pivot upward about the registration kerf (35) in the edge (B).]

13. The panel of claim 1 wherein *the* third edge [(C)] is [an edge that is] passive during the installation and removal of the panel into and from the ceiling.

14. The panel of claim 13 wherein *the* fourth edge [(D)] is [an edge that is] passive during the installation and removal of the panel into and from the ceiling.

15. In a horizontal suspended ceiling having:

a grid of inverted T-sections having flanges; and panels supported by the grid flanges; means for locking a panel to the grid flanges comprising opposed parallel first and second edges [(A and B)] that are active in installing and removing the panel from the grid, having a) in *the* first edge [(A)], an access kerf [(33)] extending horizontally along *the* first edge [(A)];

b) in *the* first edge [(A)], a registration step [(36)] extending horizontally along *the* first edge [(A)] above *the* access kerf [(33)];

c) in *the* second edge [(B)], a registration kerf [(35)] extending horizontally along *the* second edge [(B)], at a level above the access kerf [(33)] in *the first* edge [(A)];

d) an upper lip above and a lower lip below the access kerf [(33)] and *the* registration step [(36)] in *the* first edge [(A)], and an upper lip above and a lower lip below the registration kerf [(35)] in *the* second edge [(B)]; and e) means for positioning *the* upper lips above the grid flange, and the lower lips below the grid flange on *the* first and second edges [(A and B)] having e.1) first hinge means formed of the access kerf [(33)] in *the* first edge [(A)] and its adjacent flange side for first rotating the panel into a first position;

e.2) means that permit translation of the panel to disengage the first hinge means and engage second hinge means formed of *the* registration kerf [(35)] in *the* second edge [(B)] and its adjacent flange whereby the panel can be rotated in a direction counter to the first rotation; and e.3) means formed by the registration step [(36)] in *the* first edge [(A)] and *the* registration kerf [(35)] in *the* second edge [(B)] to position *the* first and second edges [(A and B)] with respect to the flange side adjacent each of *the* first and second edges [(A and B)].

16. For use in a suspended ceiling that has *a* panel supporting grid formed of inverted T-section beams, a panel, when extending horizontally, having:

a) opposing first and second edges [(A and B)], each of which has a profile different from the other;

b) at least two opposing third and fourth edges [(C and D)] that are passive in installing and removing the panel from the grid;

c) a substantially horizontal access kerf [(33)] in the profile of *the* first edge [(A)] that extends along the first edge [(A)] at a first level;

d) a substantially horizontal registration kerf [(35)] having an upper side in the profile of *the* second edge [(B)] that extends at a second level along the *second* edge above the first level of the access kerf [(33)] in the profile of *the* first edge [(A)];

e) a registration step [(36)] having a riser and a tread in the profile of *the* first edge [(A)] that extends along *the* first edge [(A)] above the first level of the *access* kerf in *the* first edge [(A)], the tread being at approximately the same level as the upper side of the registration kerf in *the* second edge [(B)];

f) *a* lower [lips] *lip* on [at least] *each of the* first and second edges [(A and B)] of the panel for concealing a portion of [a] *the* grid when installed;

g) a substantially vertical wall on the [passive] third and fourth edges [(C and D)] of the panel; and h) an upper lip on *the* first edge [(A)] having an [under side] *underside* formed by the tread of the registration step, and an upper lip on *the* second edge having an underside [(B)] formed by the upper side of the *registration* kerf in *the* second edge [(B)], [such] *each of said* upper lips formed by the underside having a lower surface at approximately the same level when the panel extends in *a* horizontal plane, that support the panel in the ceiling*; and*

*i) wherein the registration kerf has a substantially horizontal lower surface and the access kerf has a substantially horizontal upper surface.*

[17. In a group of component parts first capable of being assembled in the field into a horizontal suspended ceiling, and then capable of being disassembled; the group having a ceiling grid of intersecting beams of inverted T cross section forming grid openings, and panels, each of which is adapted to fit into, and extend horizontally within, a grid opening; the improvement comprising a panel having a) first and second opposing edges (A and B) in combination, each edge having a profile different from the other edge;

b) an upper and lower lip on each of the first and second edges (A and B);

c) a registration step in the first edge (A) having a horizontal tread formed by the upper lip;

d) an access kerf (33) in the first edge (A) at a first level below the registration step (36);

e) a registration kerf (35) in the second edge (B) formed by the upper and lower lip of the second edge (B) at a second level above the first level of the access kerf;

wherein a) in assembling a panel into the ceiling, a.1) the access kerf (33) in the first edge (A) permits the registration kerf (35) in the second edge (B) to engage, and form a hinge with, the grid; and then a.2) the registration kerf in the second edge (B) permits the panel to be shifted and rotated to engage the registration step in the first edge (A) with the grid;

b) in the panel in an assembled ceiling, the registration kerf in the second edge (B) combines with the registration step in the first edge (A) to position the panel within the grid opening;

c) in disassembling the panel from the ceiling, c.1) the registration step in the first edge (A) permits the panel to be rotated about the hinge formed by the registration kerf in the second edge (B) and the grid, and then c.2) the access kerf in the first edge (A) permits the panel to be shifted to disengage the kerf in the second edge (B) from the grid.]

[18. In a process, a group of component parts first capable of being assembled in the field into a horizontal suspended ceiling, and then capable of being disassembled; the group having a ceiling grid of intersecting beams of inverted T cross section forming grid openings, and panels, each of which is adapted to fit into, and extend horizontally within, a grid opening;

the improvement comprising a panel having a) first and second opposing edges (A and B) in combination, each edge having a profile different from the other edge;

b) an upper and lower lip on each of the first and second edges (A and B);

c) a registration step in the first edge (A) having a horizontal tread formed by the upper lip;

d) an access kerf (33) in the first edge (A) at a first level below the registration step (36);

e) a registration kerf (35) in the second edge (B) formed by the upper and lower lip of the second edge (B) at a second level above the first level of the access kerf;

wherein a) in assembling a panel into the ceiling, a.1) the access kerf (33) in the first edge (A) permits the registration kerf (35) in the second edge (B) to engage, and form a hinge with, the grid; and then a.2) the registration kerf (35) in the second edge (B) permits the panel to be shifted and rotated to engage the registration step in the first edge (A) with the grid;

b) in the panel in an assembled ceiling, the registration kerf (35) in the second edge (B) combines with the registration step (35) in the first edge (A) to position the panel within the grid opening;

c) in disassembling the panel from the ceiling, c.1) the registration step (36) in the first edge (A) permits the panel to be rotated about the hinge formed by the registration kerf (35) in the second edge (B) and the grid, and then c.2) the access kerf (33) in the first edge (A) permits the panel to be shifted to disengage the registration kerf (35) in the second edge (B) from the grid.]

19. In a ceiling panel capable of being assembled into place in an opening in a ceiling grid to form, with the grid, a horizontal suspended ceiling [and]*, the panel* having first [(A)] and second [(B)] opposing active edges, each of [such] *said first and second* active edges having an upper and a lower lip, wherein, when the panel is in place horizontally in [an] *the* opening, the grid is at least partially concealed when viewed from below;

the improvement comprising an access kerf [(33)] in the first edge [(A)] at a lower level from a level of a registration kerf [(35)] in the second edge [(B)], and a registration step [(36)] in the first edge [(A)] at a level above the level of the access kerf [(33)];

whereby, when the panel is being assembled into place in the opening, the access kerf [(33)] provides the registration kerf [(35)] with access to the grid, to, in combination with the registration step [(36)] in *the* first edge [(A)], fit the panel correctly in the opening*; and*

*wherein the registration kerf has a substantially horizontal lower surface and the access kerf has a substantially horizontal upper surface, the substantially horizontal lower surface being at a level above a level or the substantially horizontal upper surface.*

*20. A panel for use in a suspended ceiling having a panel supporting grid formed of inverted T-section beams, the panel, when extending horizontally, having:*

*a) opposing first and second edges that are active in installing and removing the panel into and from the grid, each of which has a profile different from the other;*

*b) opposing third and fourth edges, each of which has a profile;*

*c) an access kerf in the profile of the first edge that extends along the first edge at a first level;*

*d) a registration kerf in the profile of the second edge that extends along the second edge;*

*e) a tread in the registration kerf of the second edge that extends along the second edge above the first level of the access kerf in the profile of the first edge;*

*f) a registration step having a riser and a tread in the profile of the first edge that extends along the first edge above the first level of the access kerf in the first edge, the tread being approximately at the same level as the tread in the second edge;*

*g) an upper lip on the first edge having an underside formed by the tread of the registration step, and an upper lip on the second edge having an underside formed by the tread of the second edge, each of said undersides of said upper lips being at approximately the same level when the panel extends in the plane of the grid, that support the panel in the ceiling; and*

*h) the registration kerf having a substantially horizontal lower surface.*

*21. The panel of claim 20 wherein the access kerf has a substantially horizontal upper surface, the substantially horizontal lower surface of the registration kerf being at a level above the substantially horizontal upper surface of the access kerf.*

*22. The panel of claim 20 wherein the substantially horizontal lower surface of the registration kerf extends substantially parallel to the tread of the registration step.*

*23. The panel of claim 20 wherein the substantially horizontal lower surface of the registration kerf extends substantially parallel to the tread of the second edge.*

*24. The panel of claim 20 further comprising a lower lip on each of the first and second edges, the lower lip of the first edge located at a level below the first level of the access kerf and the lower lip of the second edge located at a level below a level of the registration kerf, the lower lips of the first and second edges at least partially concealing the grid when the panel is installed in the grid.*

*25. The panel of claim 24 wherein the upper lip of the second edge has an end surface that is inwardly offset from an end surface of the lower lip of the second edge.*

*26. The panel of claim 25 wherein the lower lip of the second edge comprises a cutout.*

*27. The panel of claim 26 wherein the cutout of the lower lip of the second edge comprises a substantially vertical surface and a substantially horizontal surface.*

*28. The panel of claim 27 wherein the substantially vertical surface of the cutout of the lower lip of the second edge is inwardly offset from the end surface of the lower lip of the second edge; and wherein the end surface of the upper lip of the second edge is inwardly offset from the substantially vertical surface of the cutout.*

*29. The panel of claim 20 further comprising a lower lip on each of the third and fourth edges, the lower lips of the third and fourth edges at least partially concealing the grid when the panel is installed in the grid.*

*30. The panel of claim 20 further comprising:*

*i) the access kerf having a substantially horizontal upper surface, the substantially horizontal lower surface of the registration kerf being at a level above the substantially horizontal upper surface of the access kerf;*

*j) the substantially horizontal lower surface of the registration kerf extending substantially parallel to the tread of the registration step;*

*k) the substantially horizontal lower surface of the registration kerf extending substantially parallel to the tread of the second edge;*

*l) a lower lip on each of the first and second edges, the lower lip of the first edge located at a level below the first level of the access kerf and the lower lip of the second edge located at a level below a level of the registration kerf;*

*m) the upper lip of the second edge having an end surface that is inwardly offset from an end surface of the lower lip of the second edge;*

*n) the lower lip of the second edge comprising a cutout having a substantially vertical surface and a substantially horizontal surface;*

*o) the substantially vertical surface of the cutout of the lower lip of the second edge being inwardly offset from the end surface of the lower lip of the second edge; and*

*p) the end surface of the upper lip of the second edge being inwardly offset from the substantially vertical surface of the cutout.*

*31. A panel for use in a panel supporting grid formed of inverted T-section beams, the panel, when extending horizontally, having:*

*a) opposing first and second edges that are active in installing and removing the panel into and from the grid, each of which has a profile different from the other;*

*b) opposing third and fourth edges, each of which has a profile;*

*c) an access kerf in the profile of the first edge that extends along the first edge at a first level;*

*d) a registration kerf in the profile of the second edge that extends along the second edge;*

*e) a tread in the registration kerf of the second edge that extends along the second edge above the first level of the access kerf in the profile of the first edge;*

*f) a registration step having a riser and a tread in the profile of the first edge that extends along the first edge above the first level of the access kerf in the first edge, the tread being approximately at the same level as the tread in the second edge;*

*g) an upper lip on the first edge having an underside formed by the tread of the registration step, and an upper lip on the second edge having an underside formed by the tread of the second edge, each of said undersides of said upper lips being at approximately the same level when the panel extends in the plane of the grid, that support the panel in the ceiling;*

*h) a lower lip on each of the first and second edges, the lower lip of the first edge located at a level below the first level of the access kerf and the lower lip of the second edge located at a level below a level of the registration kerf, the lower lips of the second and third edges at least partially concealing the grid when the panel is installed in the grid; and*

*i) the upper lip of the second edge having an end surface that is inwardly offset from an end surface of the lower lip of the second edge.*

*32. The panel of claim 31 further comprising a lower lip on each of the third and fourth edges, the lower lips of the third and fourth edges at least partially concealing the grid when the panel is installed in the grid.*

*33. The panel of claim 31 wherein the registration kerf has a substantially horizontal lower surface.*

*34. The panel of claim 33 wherein the access kerf has a substantially horizontal upper surface, the substantially horizontal lower surface of the registration kerf being at a level above the substantially horizontal upper surface of the access*

*kerf; and wherein the substantially horizontal lower surface of the registration kerf extends substantially parallel to the tread of the registration step.*

*35. The panel of claim 31 wherein the lower lip of the second edge comprises a cutout; wherein the cutout of the lower lip of the second edge comprises a substantially vertical surface and a substantially horizontal surface; and wherein the substantially vertical surface of the cutout of the lower lip of the second edge is inwardly offset from the end surface of the lower lip of the second edge; and wherein the end surface of the upper lip of the second edge is inwardly offset from the substantially vertical surface of the cutout.*

*36. A suspended ceiling comprising:*

*a panel supporting grid formed of inverted T-section beams having flanges;*

*a plurality of panels supported by the flanges, each of the panels comprising, when extending horizontally in the grid:*

*a) opposing first and second edges that are active in installing and removing the panel into and from the grid, each of which has a profile different from the other;*

*b) opposing third and fourth edges, each of which has a profile;*

*c) an access kerf in the profile of the first edge that extends along the first edge at a first level;*

*d) a registration kerf in the profile of the second edge that extends along the second edge;*

*e) a tread in the registration kerf of the second edge that extends along the second edge above the first level of the access kerf in the profile of the first edge;*

*f) a registration step having a riser and a tread in the profile of the first edge that extends along the first edge above the first level of the access kerf in the first edge, the tread being approximately at the same level as the tread in the second edge;*

*g) an upper lip on the first edge having an underside formed by the tread of the registration step, and an upper lip on the second edge having an underside formed by the tread of the second edge, each of said undersides of said upper lips being at approximately the same level when the panel extends in the plane of the grid, that support the panel in the ceiling; and*

*h) a lower lip on each of the first and second edges, the lower lip of the first edge located at a level below the first level of the access kerf and the lower lip of the second edge located at a level below a level of the registration kerf;*

*wherein the lower lips of the second edges of the plurality of the panels abut the lower lips of the first edges of adjacent ones of the plurality of the panels.*

*37. The suspended ceiling of claim 36 wherein each of the plurality of panels further comprises a lower lip on each of the third and fourth edges; and wherein the lower lips of the third edges of the plurality of the panels abut the lower lips of the fourth edges of adjacent ones of the plurality of the panels.*

*38. The suspended ceiling of claim 37 wherein the first, second, third, and fourth edges totally conceal the grid.*

*39. The suspended ceiling of claim 36 wherein for each of the plurality of panels, the registration kerf comprises a substantially horizontal lower surface.*

*40. The suspended ceiling of claim 39 wherein for each of the plurality of panels, the access kerf has a substantially horizontal upper surface, the substantially horizontal lower surface of the registration kerf being at a level above the substantially horizontal upper surface of the access kerf.*

*41. The suspended ceiling of claim 39 wherein for each of the plurality of panels, the substantially horizontal lower surface of the registration kerf extends substantially parallel to the tread of the registration step.*

*42. The suspended ceiling of claim 39 wherein for each of the plurality of panels, the substantially horizontal lower surface of the registration kerf extends substantially parallel to the tread of the second edge.*

*43. The suspended ceiling of claim 36 wherein for each of the plurality of panels, the upper lip of the second edge has an end surface that is inwardly offset from an end surface of the lower lip of the second edge.*

*44. The suspended ceiling of claim 43 wherein for each of the plurality of panels, the lower lip of the second edge comprises a cutout.*

*45. The suspended ceiling of claim 44 wherein for each of the plurality of panels, the cutout of the lower lip of the second edge comprises a substantially vertical surface and a substantially horizontal surface, and the substantially vertical surface of the cutout of the lower lip of the second edge is inwardly offset from the end surface of the lower lip of the second edge, and the end surface of the upper lip of the second edge is inwardly offset from the substantially vertical surface of the cutout.*

* * * * *